United States Patent
Ballard et al.

(10) Patent No.: US 8,553,685 B2
(45) Date of Patent: Oct. 8, 2013

(54) SESSION BORDER CONTROL MIGRATION

(75) Inventors: Stephen Ballard, Plano, TX (US); Scot Bartholomew, Allen, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 852 days.

(21) Appl. No.: 12/607,471

(22) Filed: Oct. 28, 2009

(65) Prior Publication Data

US 2011/0096788 A1    Apr. 28, 2011

(51) Int. Cl.
*H04L 12/26* (2006.01)
*H04L 12/56* (2011.01)

(52) U.S. Cl.
USPC .................................... 370/389; 370/395.54

(58) Field of Classification Search
None
See application file for complete search history.

(56) References Cited

U.S. PATENT DOCUMENTS

2008/0194258 A1* 8/2008 Chiu et al. .................. 455/435.1
2008/0254795 A1* 10/2008 Ratcliffe et al. ............ 455/435.1
2011/0082919 A1* 4/2011 Qiu et al. .................... 709/221

FOREIGN PATENT DOCUMENTS

EP    1855446 A1 * 11/2007

OTHER PUBLICATIONS

Author Unknown, Assign DNS through DHCP, May 21, 2005, pp. 1-9.*
Author Unknown, Nuera GX-1K Multi Service Business Gateway, Ref. No. LTRM-04016 Rev. 03, pp. 1-2, May 2009.*

* cited by examiner

*Primary Examiner* — John Blanton
*Assistant Examiner* — Christopher Crutchfield

(57) ABSTRACT

One or more devices in a provider network receive provisioning information to migrate customer devices within a customer network from an original session border controller (SBC) device of the provider network to a new SBC device, where the provisioning information includes one or more fully-qualified domain names (FQDNs) associated with the original SBC device. The one or more devices update DNS server entries for the one or more FQDNs with an Internet Protocol (IP) address associated with the new SBC device and provide, to the customer devices within the customer network, DNS entry updates for the one or more FQDNs. The new SBC device then receives SIP session signal from the customer devices, and the configuration information associated with the customer may be deleted from the original SBC.

20 Claims, 11 Drawing Sheets

SESSION BORDER CONTROL MIGRATION

BACKGROUND INFORMATION

In some voice-over-Internet-Protocol (VoIP) networks, a session border controller (SBC) may be employed for managing signaling and/or media streams. Excessive traffic on a SBC (e.g., due to customer growth and/or expansion of services) may cause a particular SBC to become overloaded, presenting a need to migrate a customer from one SBC (the overloaded SBC) to another SBC (e.g., an SBC with available capacity). Migration of customer premises equipment (CPE) (e.g., VoIP devices, such as phones, fax machines, and associated network devices) from an existing SBC to a new SBC may be accomplished by having a network administrator reprogram each CPE device with the IP address of the new SBC. Such a reprogramming process is time consuming and may provide unwanted disruption to the customer.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Figure 1:
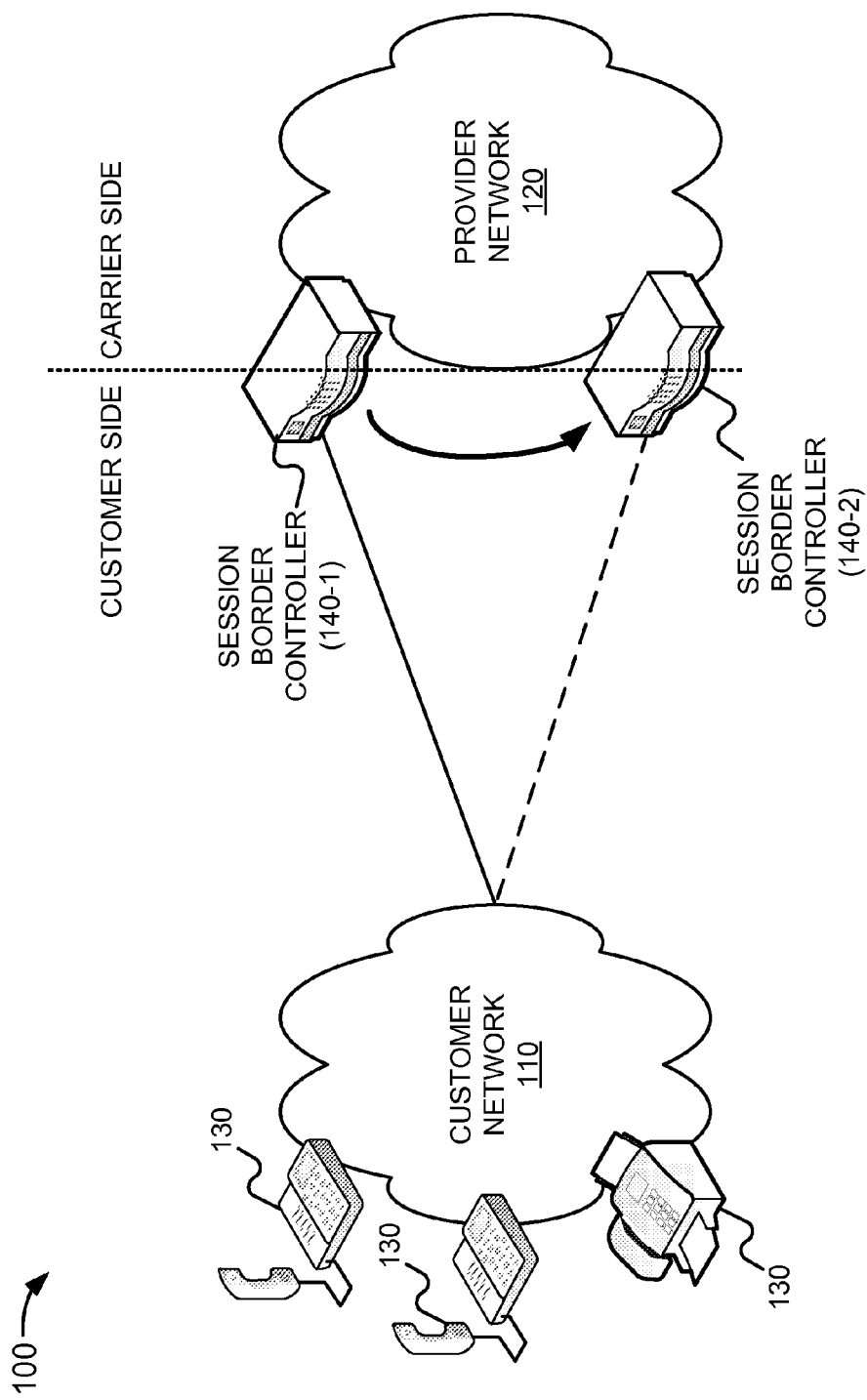
FIG. 1 is a diagram illustrating concepts described herein.

Implementations described herein may provide systems and/or methods that allow a service provider to migrate a customer from one session border controller (SBC) to another SBC in a transparent or semi-transparent manner for the customer. FIG. 1 provides a diagram illustrating concepts described herein. As illustrated, an exemplary environment 100 may include a customer network 110 and a service provider network 120. Customer network 110 may include one or more endpoint devices 130 (e.g., VoIP-enabled devices). Calls from each of endpoint devices 130 within customer network 110 may be routed by service provider network 120 to their intended recipients. A particular SBC (e.g., SBC 140-1) may be assigned to manage signaling and/or media streams for all calls from/to endpoint device 130 within customer network 110.

It may be desirable for a provider to change the particular SBC assigned to customer network 110 from SBC 140-1 to SBC 140-2. The provider of provider network 120 may prefer a migration that is transparent to the customer so as to avoid forcing the customer to reprogram all its devices (e.g., endpoint devices 130 and other network devices) with new addresses for SBC 140-2. In implementations described herein, a Domain Name System (DNS) may be used to migrate a fully qualified domain name (FQDN) (e.g., a domain name that specifies its exact location in a tree hierarchy of the DNS) and any translation rules for handling the FQDN for the current SBC (e.g., SBC 140-1) to another SBC (e.g., SBC 140-2).

The current SBC (e.g., SBC 140-1) may have a unique customer side signaling FQDN and a unique carrier side signaling FQDN. Migrating customer network 110 to SBC 140-2 may be accomplished by provisioning the same unique customer side signaling FQDN and carrier side signaling FQDN on SBC 140-2 as were used in SBC 140-1. In addition, DNS server entries for the customer side signaling FQDN and carrier side signaling FQDN may be updated with new IP addresses and ports for SBC 140-2. Endpoint devices 130 may include a DNS cache that is updated periodically (e.g., based on a time-to-live value of a DNS entry), and devices within provider network 120 (e.g., a session initiation protocol (SIP) proxy server, not shown in FIG. 1) may also periodically update their DNS cache. Thus, devices on both the customer side and carrier side may start using the new SBC (e.g., SBC 140-2) after the DNS server entries are updated and the respective DNS cache updates occur. Customer network 110, service provider network 120, endpoint devices 130, and SBCs 140 are discussed further in connection with, for example, FIGS. 2-4.

Figure 2:
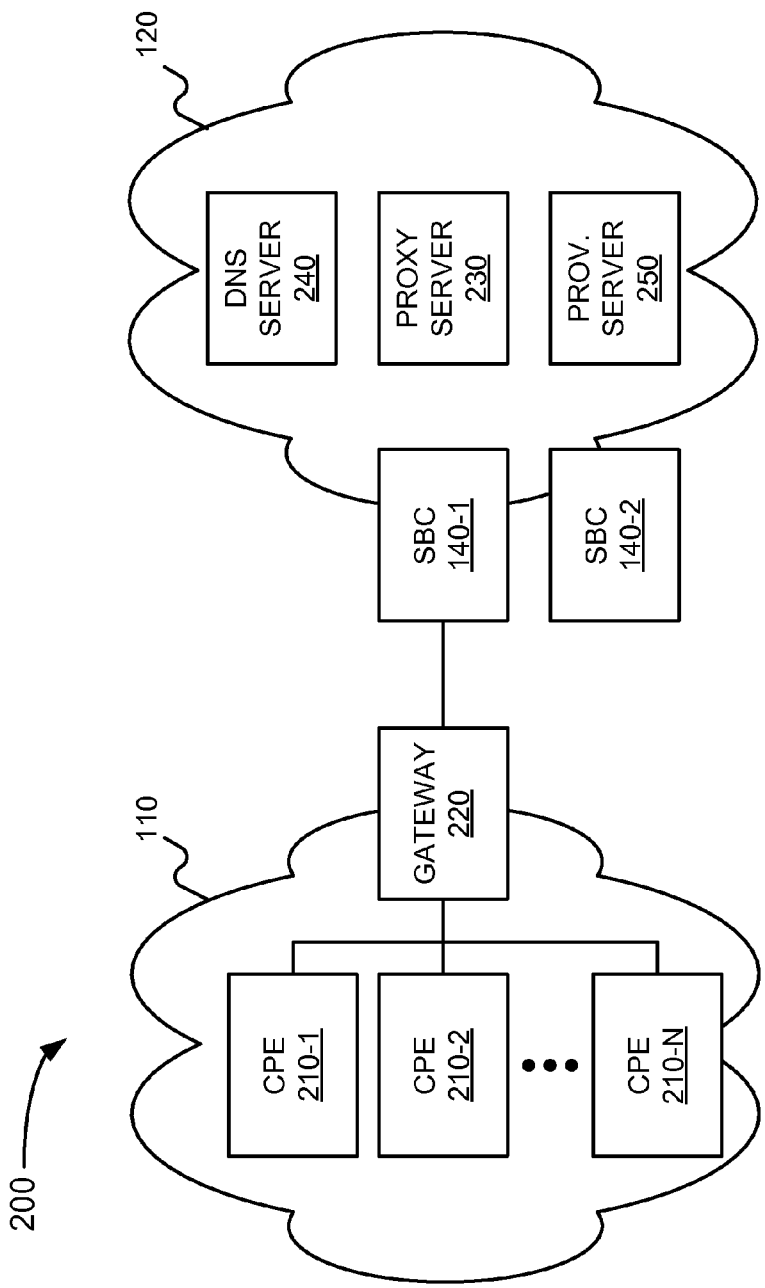
FIG. 2 depicts an exemplary network in which systems and/or methods described herein may be implemented.

FIG. 2 is a diagram of an exemplary network 200 in which systems and/or methods described herein may be implemented. As illustrated, network 200 may include customer network 110 and provider network 120. Customer network 110 may include CPE devices 210-1, 210-2, ... 210-N (referred to herein collectively as CPE devices 210 and generically as CPE device 210) and a gateway 220. Provider network 120 may include SBC 140-1 and 140-2 (referred to herein collectively as SBCs 140, and generically as SBC 140), a proxy server 230, a DNS server 240, and a provisioning server 250. Components of network 200 may interconnect via wired and/or wireless connections.

For simplicity, one customer network 110, one provider network 120, multiple CPE devices 210, two SBCs 140-1 and 140-2, one gateway 220, one proxy server 230, one DNS server 240, and one provisioning server 250 have been illustrated in FIG. 2. In practice, there may be more customer networks 110, provider networks 120, CPE devices 210, SBCs 140, gateways 220, proxy servers 230, DNS servers 240, and/or provisioning servers 250. Also, in some instances, one or more of the components of network 200 may perform one or more functions described as being performed by another one or more of the components of network 200. Although FIG. 2 illustrates exemplary network 200, in other implementations, network 200 may include differently arranged components than those depicted in FIG. 2. For example, SBCs 140 may be connected to other devices not illustrated (e.g., a service provider gateway, a public switch telephone network (PSTN) class 5 or class 3 switch, a PSTN, etc.). Additionally, or alternatively, devices may be combined into a single device or may be implemented as two or more devices. Additionally, or alternatively, the connections between devices may be direct or indirect.

Customer network 110 may include a local area network (LAN), a wide area network (WAN), or a combination of networks that provide data, voice, and/or television services to the customer or end user. In one implementation, customer network 110 may include a network interconnecting one or more devices providing data services (e.g., personal computers, workstations, laptops, etc.), one or more devices providing voice services (e.g., telephones), and/or one or more devices providing video services (e.g., televisions, set-top boxes, etc.). In the implementation of FIG. 1, customer network 110 may be an Internet-dedicated access network with access to a DNS server within provider network 120.

Each of CPE devices 210 may include any device or combination of devices that may communicate and/or facilitate VoIP sessions. CPE devices 210 may include, for example, endpoint devices 130 and other devices that transmit information to an SBC (e.g., SBC 140-1 and/or SBC 140-2). CPE devices 210 may include any combination of personal computers, laptops, telephones, or another type of computation or communication device that enable VoIP communications. For example, some CPE devices 210 may be SIP-enabled devices. Each of CPE devices 210 may also include a network device, such as a router and/or switch, which routes the data traffic (e.g., packets) for transmission over customer network 110 and/or provider network 120. Each of CPE devices 210 may include one or more computer systems for hosting programs, databases, and/or applications.

Gateway 220 may include a device that allows and/or controls access to another device or network. For example, gateway 220 may interconnect a CPE 130 in customer network 110 to a service provider (e.g., SBC 140). Gateway 220 may perform various functions, such as protocol translation, impedance matching, rate conversion, signaling translation, routing, address translation, etc. As will be described below, gateway 220 may be a device that registers with SBC 140 and/or proxy server 230 according to the SIP. Gateway 220 may connect to SBC 140 over, for example, a WAN link, to transmit and receive IP packets.

Provider network 120 may represent a network used to route customer data traffic to/from various devices in network 200, such as CPE devices 210. Provider network 120 may include devices, systems, and/or protocols that provide switching and/or routing of packets. For example, provider network 120 may include Multi-Protocol Label Switching (MPLS) devices, systems, and protocols. Protocols other than MPLS may also be used in provider network 120. Provider network 120 may include one or more sub-networks of any type, including a LAN, a WAN, a satellite network, a metropolitan area network (MAN), a telephone network, such as the PSTN or a Public Land Mobile Network (PLMN), an ad hoc network, an intranet, the Internet, or a combination of networks. The PLMN(s) may further include a packet-switched sub-network, such as, for example, a General Packet Radio Service (GPRS), Cellular Digital Packet Data (CDPD), or Mobile IP sub-network.

SBC 140 may include one or more computing devices, or other types of computation or communication devices, that forms a border to and from a service provider network (e.g., provider network 120). SBC 140 may be provisioned with a unique FQDN for a customer-side interface (e.g., with customer network 110) and a unique FQDN for a carrier-side interface (e.g., with provider network 120). In one implementation, SBC 140 may receive and respond to SIP messages to manage VoIP and other media services for customer network 110. SBC 140 may also include one or more databases. In one implementation, SBC 140 may refer to a database of information associated with registered endpoints 130 and/or devices (e.g., SIP-enabled endpoints, such as IP telephones, a personal computer with VoIP capability, a gateway, etc.). As described further herein, SBC 140 may communicate with proxy server 230 if SBC 140 does not have information associated with endpoints 130 and/or other devices. SBC 140 may connect to proxy server 230 over, for example, an IP link.

Proxy server 230 may include one or more server entities, or other types of computation or communication devices, that function as an intermediary mechanism that acts as both a server and a client for the purpose of making SIP requests on behalf of other clients (e.g., endpoint 130). Proxy server 230 may, for example, interpret, and, if necessary, rewrite a SIP request message before forwarding it. Proxy server 230 may also include security, call routing (e.g., static and dynamic registrations), call-forwarding, privacy, accounting, and/or stateful or stateless transaction capabilities.

DNS server 240 may include one or more server entities, or other types of computation or communication devices, that may perform DNS lookup functions for provider network 120. Through DNS server 240, domain names, such as an FQDN, may be mapped to their official IP addresses (e.g., IPv4 or IPv6 addresses). As used herein, the term "domain name" may be used to refer to a text-based identifier for an IP address. DNS server 240 may perform a DNS lookup so that a request from, for example, CPE 210 can be appropriately routed through provider network 120 toward an intended recipient.

Provisioning server 250 may include one or more server entities, or other types of computation or communication devices, that may provide instructions/information to configure other devices. Provisioning server 250 may accept inputs from a user via a user interface (e.g., a command line interface (CLI), or a graphical user interface (GUI)) and/or via a network. For example, provisioning server 250 may be implemented to allow, for example, a network operator or administrator to manage the configuration components of SBCs 140 and or proxy server 240.

In implementations described herein, a service provider may initiate a migration of customer network 110 from SBC 140-1 to SBC 140-2. Provisioning server 250 (or another device or a user directly accessing a user interface of SBC 140-2) may provision SBC 140-2 with the same unique customer FQDN and carrier FQDN as SBC 140-1. Also, provisioning server 250 (or another device or a user directly accessing a user interface of SBC 140-2) may update, in DNS server 240, entries for the customer FQDN and carrier FQDN with the new IP addresses and ports of SBC 140-2. DNS server 240 may provide the migrated IP addresses (e.g., of SBC 140-2) for the customer FQDN to CPE device(s) 210 and proxy server 230. Thus, when CPE 210, for example, initiates a next SIP session, the call may be directed to SBC 140-2. All devices may not be required to update their DNS cache at the same time if these devices are only relying on the FQDN to identify the appropriate SBC, since the FQDN does not change during the migration.

Figure 3:
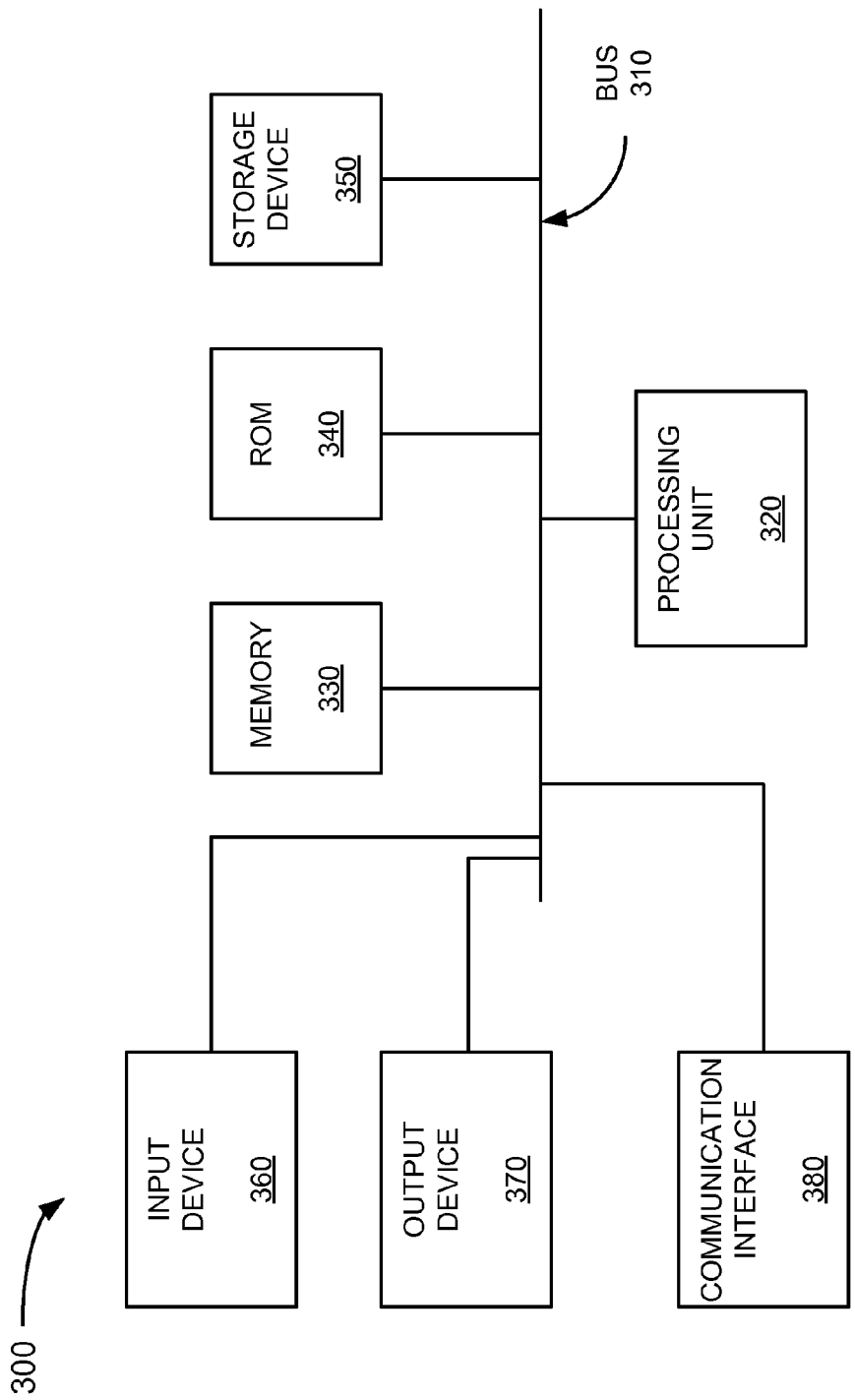
FIG. 3 is a block diagram of exemplary components of a device that may correspond to a session border controller, a proxy server, and/or a provisioning server of FIG. 2.

FIG. 3 is a diagram illustrating exemplary components of a device 300 that may correspond to one or more of the devices depicted in FIG. 2. For example, device 300 may correspond to SBCs 140, certain CPE devices 210, proxy server 230, DNS server 240, and/or provisioning server 250. As illustrated, device 300 may include a bus 310, a processing unit 320, a main memory 330, a read-only memory (ROM) 340, a storage device 350, an input device 360, an output device 370, and a communication interface 380.

Bus 310 may include a path that permits communication among the components of device 300. Processing unit 320 may include one or more processors, microprocessors, or other types of processing units, such as application-specific integrated circuits (ASICs), field-programmable gate arrays (FPGAs), etc., that may interpret and execute instructions. Main memory 330 may include a RAM or another type of dynamic storage device that stores information and instructions for execution by processing unit 320. ROM 340 may include a ROM device or another type of static storage device that may store static information and instructions for use by processing unit 320. Storage device 350 may include a magnetic and/or optical recording medium and its corresponding drive.

Input device 360 may include a mechanism that permits an operator to input information to device 300, such as a keyboard, a mouse, a pen, voice recognition and/or biometric mechanisms, a touch-screen interface, etc. Output device 370 may include a mechanism that outputs information to the operator, including a display, a printer, a speaker, etc. Communication interface 380 may include any transceiver-like mechanism that enables device 300 to communicate with other devices and/or systems. For example, communication interface 380 may include mechanisms for communicating with another device or system via a network, such as customer network 110 and/or provider network 120.

As described herein, device 300 may perform certain operations in response to processing unit 320 executing software instructions contained in a computer-readable medium, such as main memory 330. A computer-readable medium may be defined as a physical or logical memory device. A logical memory device may include memory space within a single physical memory device or spread across multiple physical memory devices. The software instructions may be read into main memory 330 from another computer-readable medium, such as storage device 350, or from another device via communication interface 380. The software instructions contained in main memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 illustrates exemplary components of device 300, in other implementations, device 300 may include fewer, different, differently arranged, or additional components than those depicted in FIG. 3. In still other implementations, one or more components of device 300 may perform one or more other tasks described as being performed by one or more other components of device 300.

Figure 4:
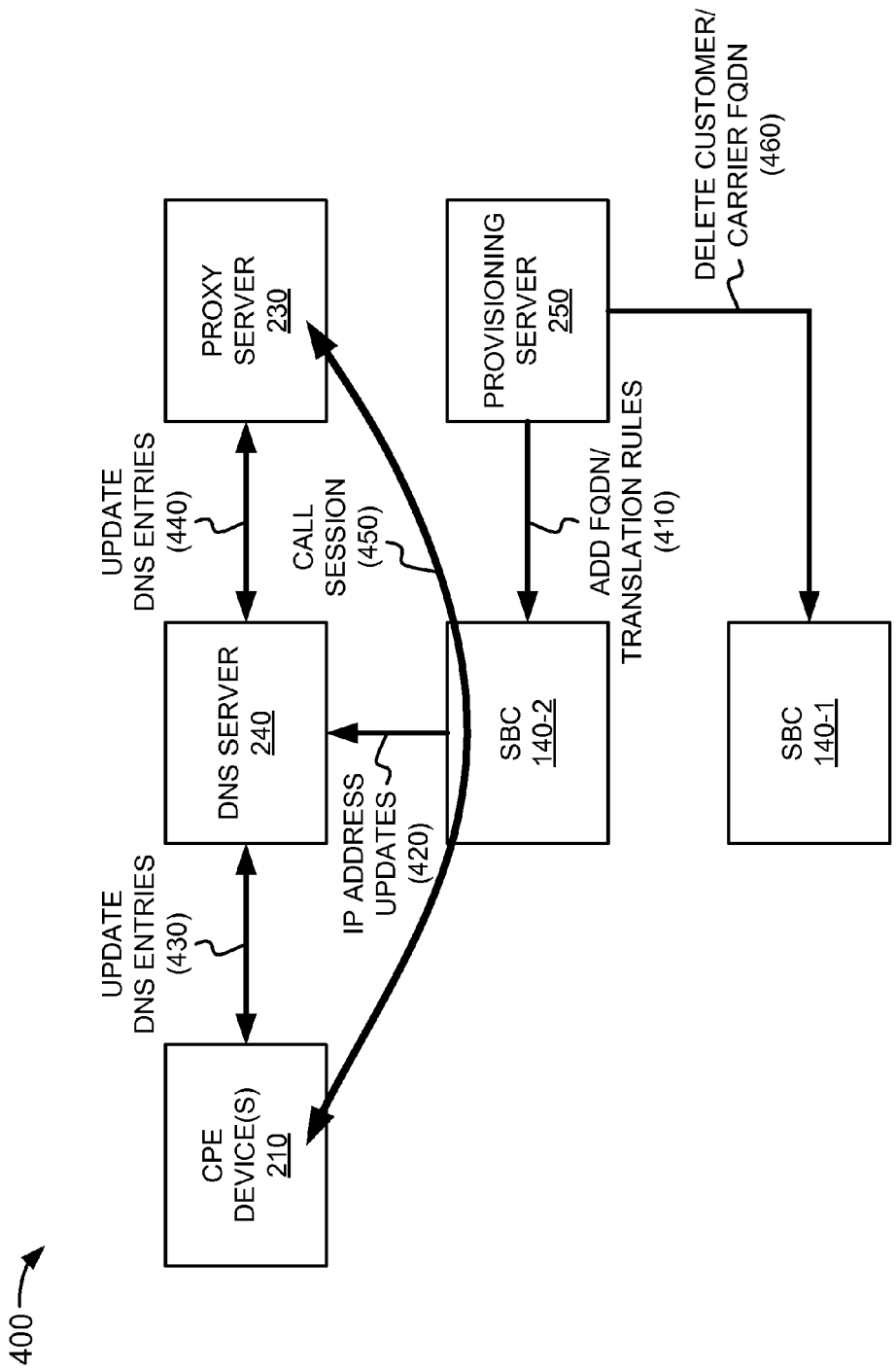
FIG. 4 depicts a diagram of exemplary interactions among components of an exemplary portion of the network illustrated in FIG. 2.

FIG. 4 depicts a diagram of exemplary interactions among components of an exemplary portion 400 of network 200. As illustrated, exemplary network portion 400 may include CPE device(s) 210, SBC 140-1, SBC 140-2, proxy server 230, DNS server 240, and provisioning server 250. CPE device(s) 210, SBC 140-1, SBC 140-2, proxy server 230, DNS server 240, and provisioning server 250 may include the features described above in connection with, for example, FIGS. 1-3.

As indicated by reference number 410 of FIG. 4, provisioning server 250 may provision, on SBC 140-2, the unique customer-side signaling FQDN and the unique carrier-side signaling FQDN originally associated with SBC 140-1. Provisioning server 250 may also provision, on SBC 140-2, any translation rules associated with the unique customer-side signaling FQDN and the unique carrier-side signaling FQDN.

As indicated by reference number 420, DNS server entries for the unique customer-side signaling FQDN and the unique carrier-side signaling FQDN may be updated with new IP addresses (e.g., static IPv4 or IPv6 addresses) and ports for the new SBC (e.g., SBC 140-2). IP address updates 420 may be provided using known IP addressing schemes. Systems and/or methods described herein may be generally independent of particular IP addressing schemes. In one exemplary implementation, a database of record (not shown) may validate the new IP addresses assigned to the customer-side signaling FQDN and the carrier-side signaling FQDN so that the IP addresses do not create a routing conflict. The database of record can insure that, if a new router (or subnet) is also being selected as part of the SBC migration, then the IP addresses for SBC 140-2 assigned to the customer-side signaling FQDN and the carrier-side signaling FQDN do not overlap the subnet for SBC 140-1. The subnet for SBC 140-1 may still be valid during (and possibly after) the SBC migration, since a customer may still have other SBC configurations residing on the same router (or subnet).

CPE device(s) 210 may update their DNS cache from DNS server 240, as indicated by reference number 430. For example, CPE device(s) 210 may request updates from DNS server 240 based on expiration of a time-to-live value for a DNS entry stored at CPE device(s) 210. In response to the request from CPE device(s) 210, DNS server 240 may provide updated DNS entries 430. Similarly, proxy server 230 may update its DNS cache from DNS server 240, as indicated by reference number 440. For example, proxy server 230 may request updates from DNS server 240 based on expiration of a time-to-live value for a DNS entry stored at proxy server 230. In response to the request from proxy server 230, DNS server 240 may provide updated DNS entries 440.

After each of CPE device(s) 210 has updated its DNS cache, CPE device(s) 210 may initiate a subsequent call session 450 through SBC 140-2, using the same FQDN that previously routed to SBC 140-1 before the SBC migration. Similarly, after proxy server 230 has updated its DNS cache, proxy server 230 may route subsequent call session 450 (e.g., initiated by an endpoint other than a CPE device 210) through SBC 140-2 to CPE device(s) 210, using the same FQDN that previously routed to SBC 140-1 before the SBC migration.

Provisioning server 250 may send instructions to SBC 140-1 to delete the migrated customer-side signaling FQDN and carrier-side signaling FQDN, as indicated by reference number 460. Delete instructions 460 may be provided at a time after DNS cache update 430 and DNS cache update 440 may be completed based on, for example, the maximum period of a time-to-live value for a DNS entry stored at CPE device 210 and/or proxy server 250. SBC 140-1 may, thus, be relieved of SIP traffic associated with customer network 110 as well as the memory and processor load required for supporting such SIP traffic. Also, the migration of CPE device(s) 210 (e.g., on customer network 110) from SBC 140-1 to SBC 140-2 may be automatically completed in a manner transparent to the customer.

Although FIG. 4 shows exemplary components of network portion 400, in other implementations, network portion 400 may contain fewer, different, differently arranged, or additional components than depicted in FIG. 4. In still other implementations, one or more components of network portion 400 may perform one or more other tasks described as being performed by one or more other components of network portion 400.

Figure 5:
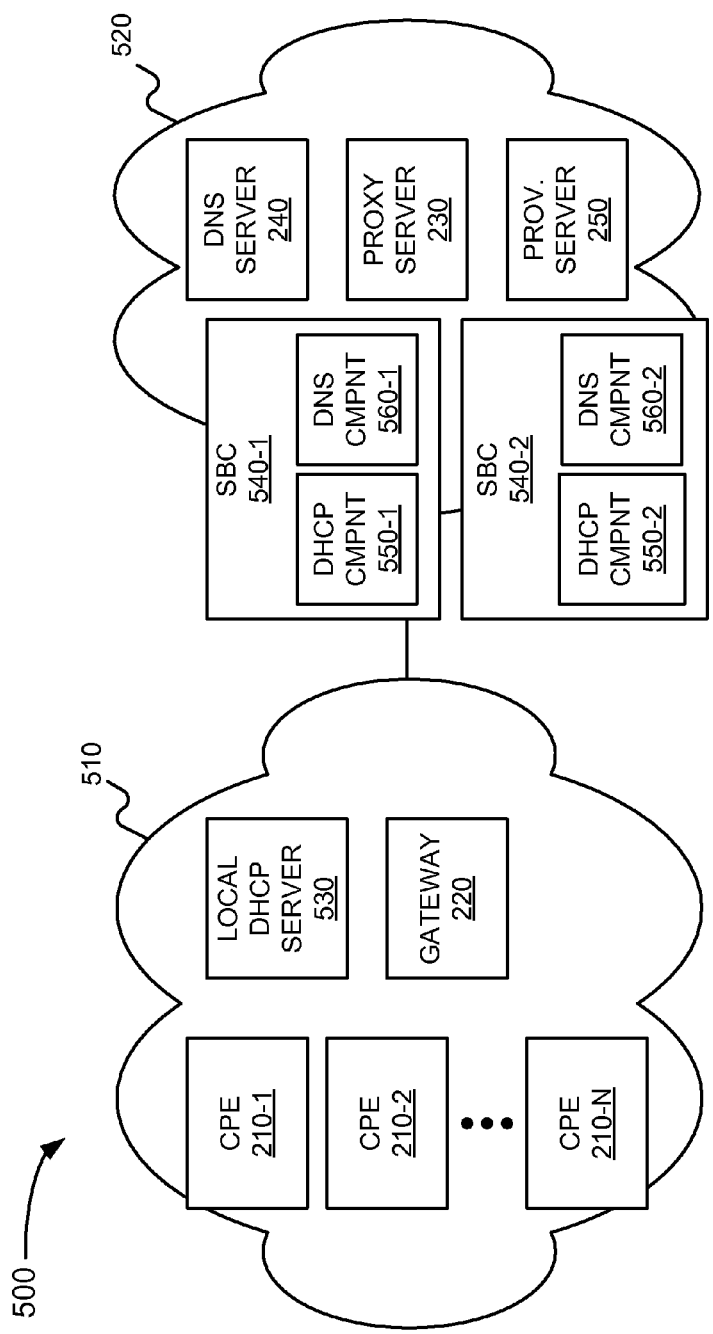
FIG. 5 depicts another exemplary network in which systems and/or methods described herein may be implemented.

FIG. 5 depicts another exemplary network 500 in which systems and/or methods described herein may be implemented. As illustrated, network 500 may include a customer network 510 and a provider network 520. Customer network 510 may include CPE devices 210-1, 210-2, . . . 210-N, gateway 220, and a local dynamic host configuration protocol (DHCP) server 530. Provider network 520 may include SBCs 540-1 and 540-2 (referred to herein collectively as SBCs 540, and generically as SBC 540), proxy server 230, DNS server 240, and provisioning server 250. Each SBC 540 may include a DHCP component ("DHCP CMPNT") 550-1 and 550-2 (referred to herein collectively as DHCP components 550, and generically as DHCP component 550) and a DNS component ("DNS CMPNT") 560-1 and 560-2 (referred to herein collectively as DNS components 560, and generically as DNS component 560). Components of network 500 may interconnect via wired and/or wireless connections. CPE devices 210, gateway 220, proxy server 230, DNS server 240, and provisioning server 250 may include the features described above in connection with, for example, FIG. 2-4.

Customer network 510 may be a private IP network, such that both SIP message traffic and DNS services are provided by the current SBC (e.g., SBC 140-1). CPE devices 210 may use the unique customer-side FQDN for SBC 140-1 to conduct SIP sessions. However, CPE devices 210 may use a static IP address for the DNS component 560-1 within SBC 540-1 to request DNS services.

Local DHCP server 530 may include one or more server entities, or other types of computation or communication devices, that may obtain and provide configuration information of CPE devices 210 for operation within network 500. CPE device 210 (e.g., a DHCP-configured device in the implementation of FIG. 5) may send a broadcast query requesting information from local DHCP server 530. Local DHCP server 530 may, among other activities, manage information about DNS servers for CPE equipment 210. In one implementation, local DHCP server 530 may include the components of device 300 (FIG. 3).

SBC 540 may include the features described above in connection with, for example, SBC 140 of FIGS. 2-4. Additionally, SBC 540 may incorporate functionalities of DHCP component 550 and DNS component 560. DNS component 560 may include the features described above in connection with, for example, DNS server 240 of FIGS. 2-4.

DHCP component 550 may include hardware or a combination of hardware and software that may act as a DHCP server to provide DHCP information to local DHCP server 530. In an exemplary implementation, DHCP component 550 may provide updates/changes to static IP addresses that CPE devices 210 use for DNS lookups (e.g., from DNS component 560).

DNS component 560 may include hardware or a combination of hardware and software that may provide DNS server functionality for CPE 210 within customer network 510. In an exemplary implementation, DNS component 560 may provide DNS cache updates to CPE devices(s) 210.

In implementations described herein, a service provider may initiate a migration of customer network 110 from SBC 540-1 to SBC 540-2. Provisioning server 250 (or another device or a user directly accessing a user interface of SBC 540-2) may provision SBC 140-2 with the same unique customer FQDN and carrier FQDN as SBC 540-1. Also, provisioning server 250 (or another device or a user directly accessing a user interface of SBC 540-2) may update, in DNS component 560-2, entries for the customer FQDN and carrier FQDN with the new IP addresses and ports of SBC 540-2. Provisioning sever 250 may further update DHCP information in DHCP component 550-1 of SBC 540-1. The updated DHCP information may include changes to the static IP addresses CPE devices 210 may use for DNS lookups. More particularly, provisioning server 250 may change, in the DHCP information, the DNS server address for customer network 510 from the static IP addresses of SBC 540-1 to the static IP addresses of SBC 540-2.

Local DHCP server 530 may receive the updated information from DHCP component 550-1 and forward the updated information to each CPE device 210. CPE devices 210 may then direct DNS queries to the static IP addresses of SBC 540-2/DNS component 560-2, and DNS component 560-2 may provide the migrated IP addresses (e.g., of SBC 540-2) for the customer FQDN. Thus, when CPE 210 initiates a next SIP session, the call will be direct to SBC 540-2.

Although FIG. 5 shows exemplary components of network 500, in other implementations, network 500 may contain fewer, different, differently arranged, or additional components than depicted in FIG. 5. In still other implementations, one or more components of network 500 may perform one or more other tasks described as being performed by one or more other components of network 500. For example, while SBC 540, DHCP component 550, and DNS component 560 are shown as an integrated component in the implementation of FIG. 5, in other implementations, SBC 540, DHCP component 550, and DNS component 560 may be distributed components.

Figure 6:
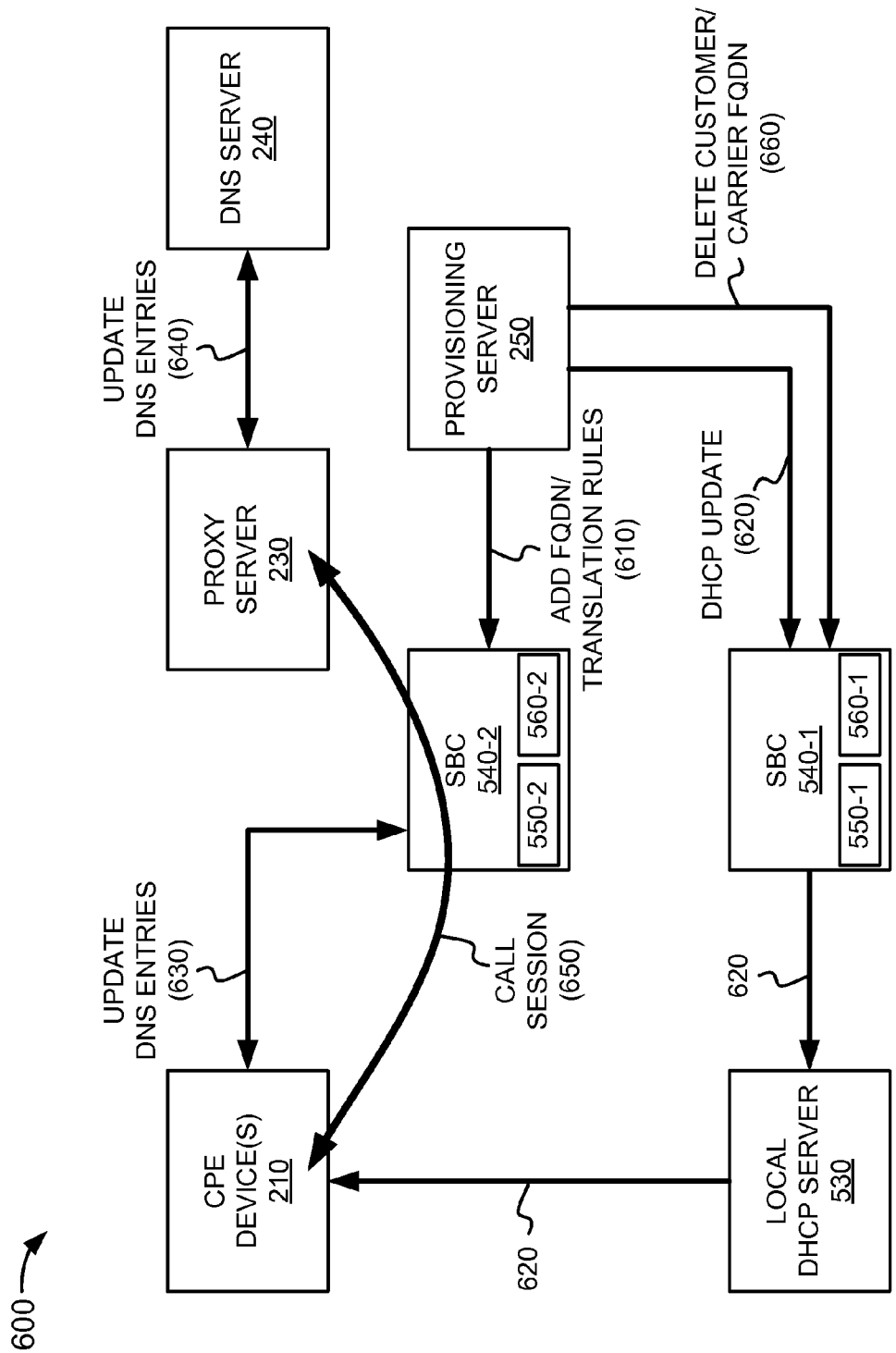
FIG. 6 depicts a diagram of exemplary interactions among components of an exemplary portion of the network illustrated in FIG. 5.

FIG. 6 depicts a diagram of exemplary interactions among components of an exemplary portion 600 of network 500. As illustrated, exemplary network portion 600 may include CPE device(s) 210, proxy server 230, DNS server 240, provisioning server 250, local DHCP server 530, SBC 540-1 (including DHCP components 550-1 and DNS component 560-1), and SBC 540-2 (including DHCP components 550-2 and DNS component 560-2). CPE device 210, proxy server 230, DNS server 240, provisioning server 250, local DHCP server 530, SBC 540-1, and/or SBC 540-2 may include the features described above in connection with, for example, FIGS. 1-5.

As indicated by reference number 610 of FIG. 6, provisioning server 250 may provision, on SBC 540-2, the unique customer-side signaling FQDN and the unique carrier-side signaling FQDN originally associated with SBC 540-1. Provisioning server 250 may also provision, on SBC 540-2, any translation rules associated with the unique customer-side signaling FQDN and the unique carrier-side signaling FQDN. The DNS component (e.g., DNS component 560-2) of SBC 540-2 may update DNS entries with new IP addresses (e.g., static IPv4 or IPv6 addresses) and ports for the unique customer-side signaling FQDN and the unique carrier-side signaling FQDN for the new SBC (e.g., SBC 540-2).

Provisioning server 250 may also provide a DHCP update 620 to SBC 540-1. DHCP update 620 may include instructions to change, in the DHCP information for customer network 510, the DNS server address from the static IP addresses of SBC 540-1 to the static IP addresses of SBC 540-2. In one implementation, DHCP component 550-1 of SBC 540-1 may receive DHCP update 620 and forward DHCP update 620 to local DHCP server 530. Local DHCP server 530 may, in turn, provide DHCP update 620 to CPE device(s) 210 so as to provide the static IP addresses of SBC 540-2/DNS component 560-2 as the new DNS server address.

Based on DHCP update 620, CPE device(s) 210 may update their DNS cache from DNS component 560-2 associated with SBC 540-2 (e.g., instead of DNS component 560-1 in the pre-migration configuration), as indicated by reference number 630. For example, CPE device(s) 210 may request updates from DNS component 560-2/SBC 540-2 based on expiration of a time-to-live value for a DNS entry stored at CPE device 210. In response to the request from CPE device 210, DNS component 560-2/SBC 540-2 may provide updated DNS entries 630.

Similarly, proxy server 230 may update its DNS cache from DNS server 240, as indicated by reference number 640. DNS server 240 may receive updates for unique customer-side signaling FQDN and the unique carrier-side signaling FQDN from, for example, DNS component 560-2, provisioning server 250, or another DNS component (not shown). Proxy server 230 may request updates from DNS server 240 based on expiration of a time-to-live value for a DNS entry stored at proxy server 230. In response to the request from proxy server 230, DNS server 240 may provide updated DNS entries 640.

After CPE device 210 has updated its DNS cache, CPE device 210 may initiate a subsequent call session 650 through SBC 540-2, using the same FQDN that previously routed to SBC 540-1 before the SBC migration. Similarly, after proxy server 230 has updated its DNS cache, proxy server 230 may route subsequent call session 650 (e.g., initiated by an endpoint other than CPE 210) through SBC 540-2, using the same FQDN that previously routed to SBC 540-1 before the SBC migration.

Provisioning server 250 may send instructions to SBC 540-1 to delete the migrated customer-side signaling FQDN and carrier-side signaling FQDN, as indicated by reference number 660. Delete instructions 660 may be provided at a time after DNS cache update 630 and DNS cache update 640 would be completed based on, for example, the maximum period of a time-to-live value for a DNS entry stored at CPE device 210 and/or proxy server 250. SBC 540-1 may, thus, be relieved of SIP traffic associated with customer network 510 as well as the memory and processor load required to support such SIP traffic. Also, the migration of CPE devices 210 (e.g., on customer network 510) from SBC 540-1 to SBC 540-2 may be automatically completed in a manner that is transparent to the customer.

Although FIG. 6 shows exemplary components of network portion 600, in other implementations, network portion 600 may contain fewer, different, differently arranged, or additional components than depicted in FIG. 6. In still other implementations, one or more components of network portion 600 may perform one or more other tasks described as being performed by one or more other components of network portion 600.

Figure 7:
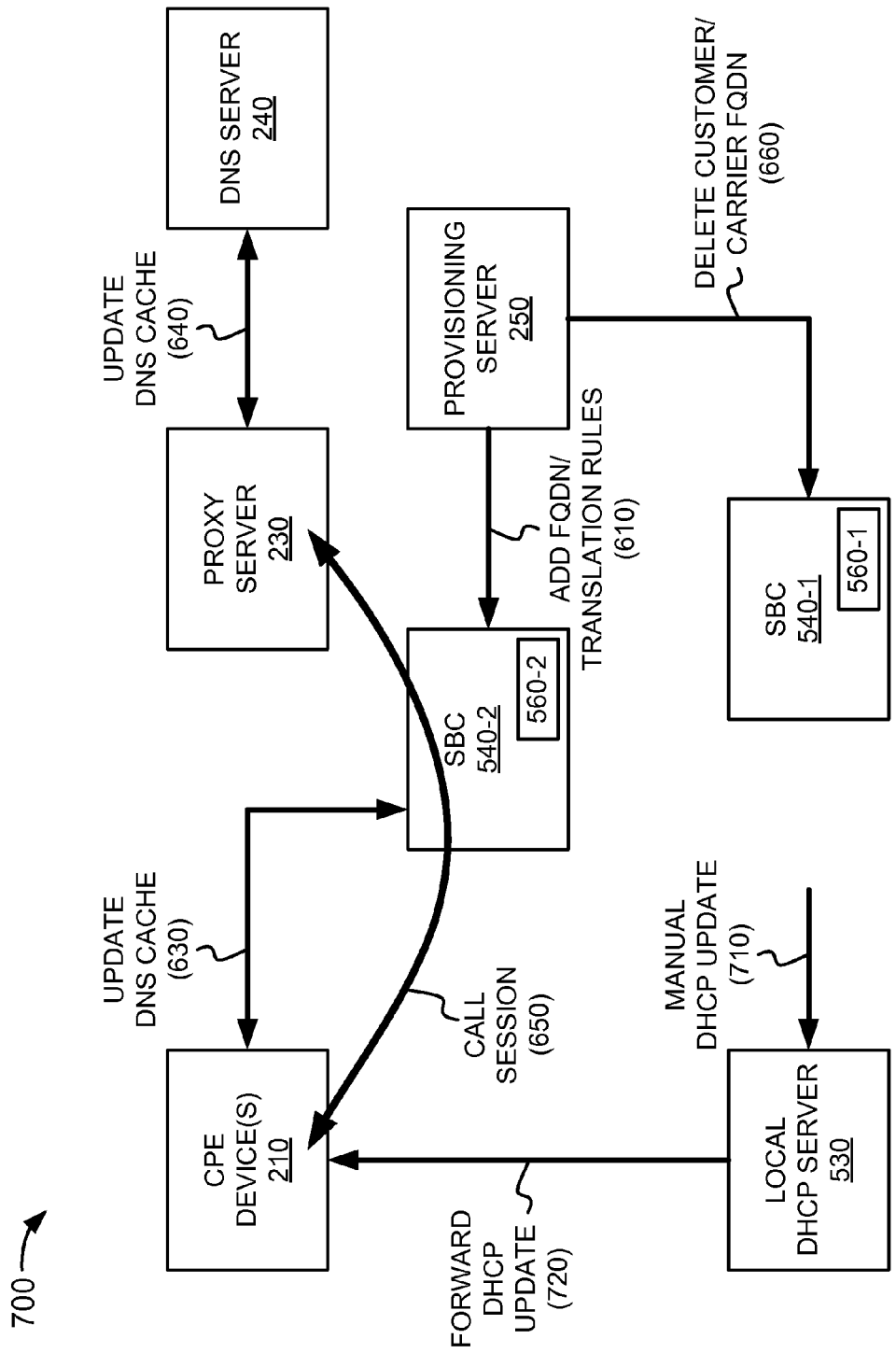
FIG. 7 depicts a diagram of exemplary interactions among components of another exemplary portion of the network illustrated in FIG. 5.

FIG. 7 depicts a diagram of exemplary interactions among components of another exemplary portion 700 of network 500. As shown in FIG. 7, DHCP components 550 may be removed from SBCs 540. Thus, as illustrated, exemplary network portion 700 may include CPE device(s) 210, proxy server 230, DNS server 240, provisioning server 250, local DHCP server 530, SBC 540-1 (including DNS component 560-1), and SBC 540-2 (including DNS component 560-2). CPE device(s) 210, proxy server 230, DNS server 240, provisioning server 250, local DHCP server 530, SBCs 540, and DNS components 560 may include the features described above in connection with, for example, FIGS. 1-6.

The exemplary interactions among components of network portion 700 may be substantially similar to the interactions described in connection with network portion 600 of FIG. 6, with the exception that DHCP update 620 of FIG. 6 may be eliminated and manual DHCP update 710 and forward DHCP update 720 may be provided.

In one implementation, manual DHCP update 710 may be provided by a network administrator of customer network 510. In another implementation, manual DHCP update 710 may be provided by, for example, an operator of provider network 520 using a remote interface connection. DHCP update 710 may change the DNS server address from the 'old' static IP addresses of SBC 540-1 to the 'new' static IP addresses of SBC 540-2. Local DHCP server 530 may, in turn, forward DHCP update 720 to CPE device(s) 210 so as to provide the static IP addresses of SBC 540-2/DNS component 560-2 as the new DNS server address.

Other interactions among components of network portion 700 may occur as described above so that SBC 540-1 may be relieved of the SIP traffic, memory, and processor load associated with customer network 510. Also, the migration of CPE device(s) 210 (e.g., on customer network 510) from SBC 540-1 to SBC 540-2 may be automatically completed in a manner that is semi-transparent to the customer. That is, while a manual update of local DHCP server 530 may occur, manual updates for each of CPE devices 210 may not be required.

Although FIG. 7 shows exemplary components of network portion 700, in other implementations, network portion 700 may contain fewer, different, differently arranged, or additional components than depicted in FIG. 7. In still other implementations, one or more components of network portion 700 may perform one or more other tasks described as being performed by one or more other components of network portion 700.

Figure 8:
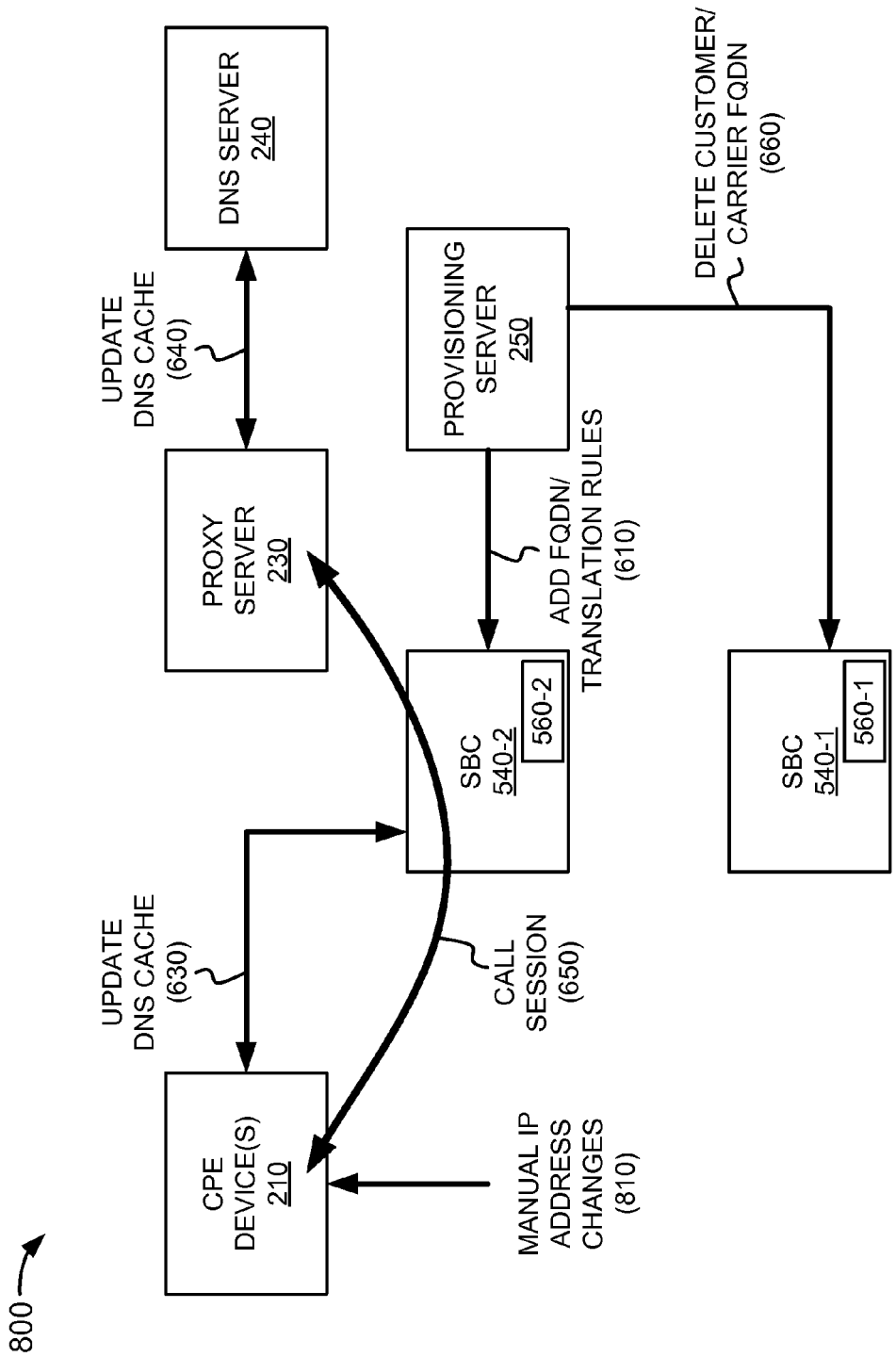
FIG. 8 depicts a diagram of exemplary interactions among components of still another exemplary portion of the network illustrated in FIG. 5.

FIG. 8 depicts a diagram of exemplary interactions among components of another exemplary portion 800 of network 500. As shown in FIG. 8, DHCP components 550 may be removed from SBCs 540 and local DHCP server 530 may not be provided. Thus, as illustrated, exemplary network portion 800 may include CPE device(s) 210, proxy server 230, DNS server 240, provisioning server 250, SBC 540-1 (including DNS component 560-1), and SBC 540-2 (including DNS component 560-2). CPE device(s) 210, proxy server 230, DNS server 240, provisioning server 250, SBCs 540, and DNS components 560 may include the features described above in connection with, for example, FIGS. 1-7.

The exemplary interactions among components of network portion 800 may be substantially similar to the interactions described in connection with network portion 600 of FIG. 6, with the exception that DHCP update 620 of FIG. 6 may be eliminated and manual IP address changes 810 for CPE device(s) 210 may be provided.

In one implementation, manual IP address changes 810 may be provided by a network administrator of customer network 510 and/or users of CPE device(s) 210. Manual IP address changes 810 may change, within each CPE device 210, the DNS server address from the 'old' static IP addresses of SBC 540-1 to the 'new' static IP addresses of SBC 540-2. CPE device(s) 210 may then update their DNS cache from DNS component 560-2 associated with SBC 540-2 (e.g., instead of DNS component 560-1 in the pre-migration configuration), as indicated by reference number 630.

Other interactions among components of network portion 800 may occur as described above so that SBC 540-1 may be relieved of the SIP traffic, memory, and processor load associated with customer network 510. Also, the migration of CPE devices 210 (e.g., on customer network 510) from SBC 540-1 to SBC 540-2 may be automatically completed in a manner that is semi-transparent to the customer. That is, while a manual update of CPE devices 210 may occur, the manual updates may be limited to changing the IP address for the DNS server instead of all IP addresses.

Although FIG. 8 shows exemplary components of network portion 800, in other implementations, network portion 800 may contain fewer, different, differently arranged, or additional components than depicted in FIG. 8. In still other implementations, one or more components of network portion 800 may perform one or more other tasks described as being performed by one or more other components of network portion 800.

Figure 9:
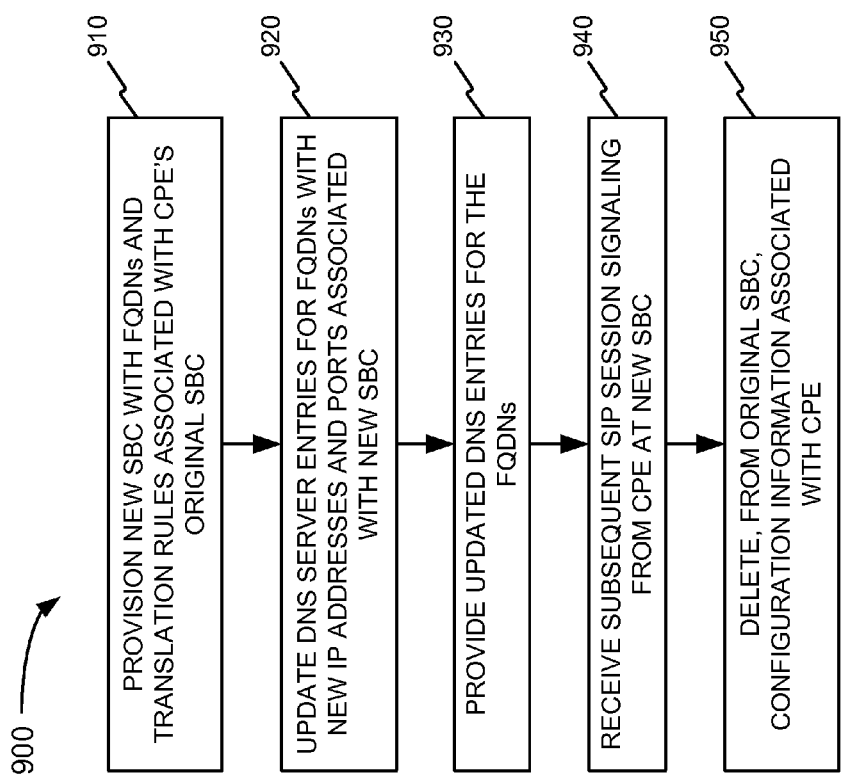
FIG. 9 provides a flow chart of an exemplary process for migrating devices in a customer network with Internet dedicated access to a new SBC according to implementations described herein.

FIG. 9 provides a flow chart of an exemplary process 900 for migrating devices within a customer network with Internet dedicated access to a new SBC according to implementations described herein. In one implementation, some or all of process 900 may be performed by one or more devices associated with a provider network (e.g., provider network 120), such as provisioning server 250, SBC 140, and/or DNS server 240. In other implementations, some or all of process 900 may be performed by another device or group of devices associated with a provider network.

Process 900 may include provisioning a new SBC with FQDNs and translation rules associated with a CPE's original SBC (block 910). For example, as described above in connection with FIG. 4, provisioning server 250 may provision, on SBC 140-2, the unique customer-side signaling FQDN and the unique carrier-side signaling FQDN originally associated with SBC 140-1, as indicated by reference number 410. Provisioning server 250 may also provision, on SBC 140-2, any translation rules associated with the unique customer-side signaling FQDN and the unique carrier-side signaling FQDN.

Returning to FIG. 9, DNS server entries for the FQDNs may be updated with new IP addresses and ports associated with the new SBC (block 920), updated DNS entries for the FQDNs may be provided (block 930), and subsequent SIP session signaling from the CPE may be received at the new SBC (block 940). For example, as described above in connection with FIG. 4, DNS server entries for the unique customer-side signaling FQDN and the unique carrier-side signaling FQDN may be updated with new IP addresses (e.g., static IPv4 or IPv6 addresses) and ports for the new SBC (e.g., SBC 140-2), as indicated by reference number 420. CPE device(s) 210 may update their DNS cache from DNS server 240, as indicated by reference number 430. For example, CPE device(s) 210 may request updates from DNS server 240 based on expiration of a time-to-live value for a DNS entry stored at CPE device(s) 210. In response to the request from CPE device(s) 210, DNS server 240 may provide updated DNS entries 430. Similarly, proxy server 230 may update its DNS cache from DNS server 240, as indicated by reference number 440. After each of CPE device(s) 210 has updated its DNS cache, CPE device(s) 210 may initiate a subsequent call session 450 through SBC 140-2, using the same FQDN that previously routed to SBC 140-1 before the SBC migration. Similarly, after proxy server 230 has updated its DNS cache, proxy server 230 may route subsequent call session 450 (e.g., initiated by an endpoint other than a CPE device 210) through SBC 140-2 to CPE device(s) 210, using the same FQDN that previously routed to SBC 140-1 before the SBC migration.

Again referring to FIG. 9, configuration information associated with the CPE may be deleted from the original SBC (block 950). For example, as described above in connection with FIG. 4, provisioning server 250 may send instructions to SBC 140-1 to delete the migrated customer-side signaling FQDN and carrier-side signaling FQDN, as indicated by reference number 460. Delete instructions 460 may be provided at a time after DNS cache update 430 and DNS cache update 440 would be completed based on, for example, the maximum period of a time-to-live value for a DNS entry stored at CPE device 210 and/or proxy server 250.

Figure 10:
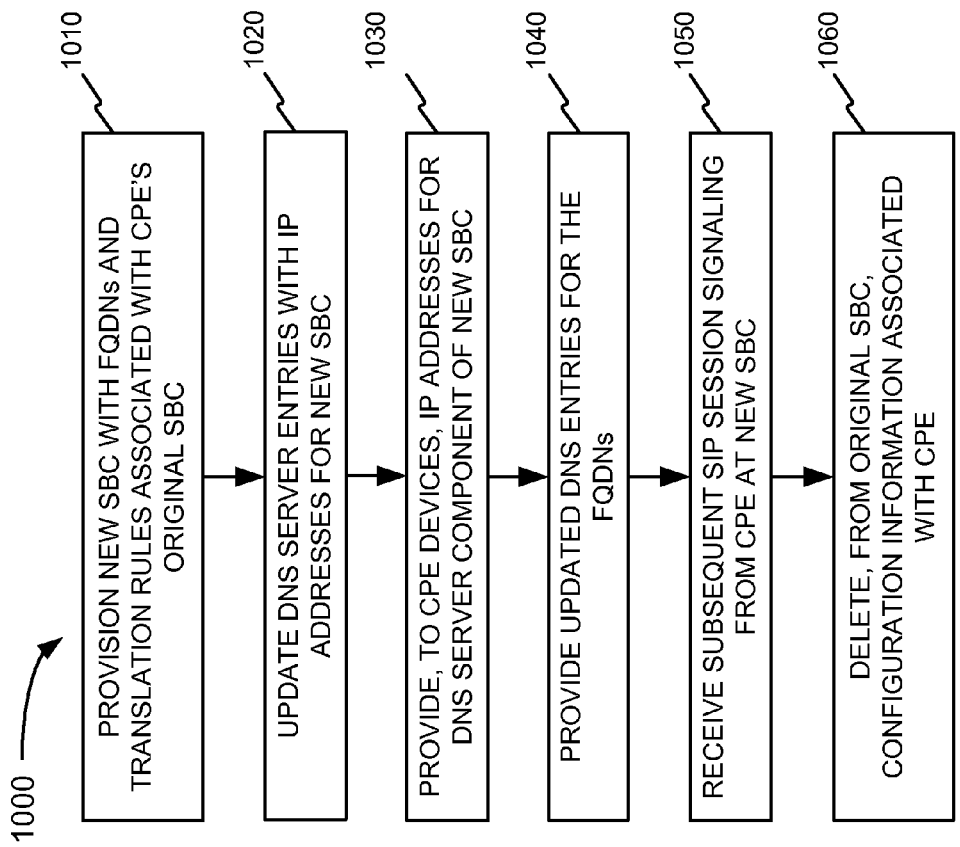
FIGS. 10 and 11 provide flow charts of an exemplary process for migrating devices in a private IP customer network to a new SBC according to implementations described herein.
Figure 11:
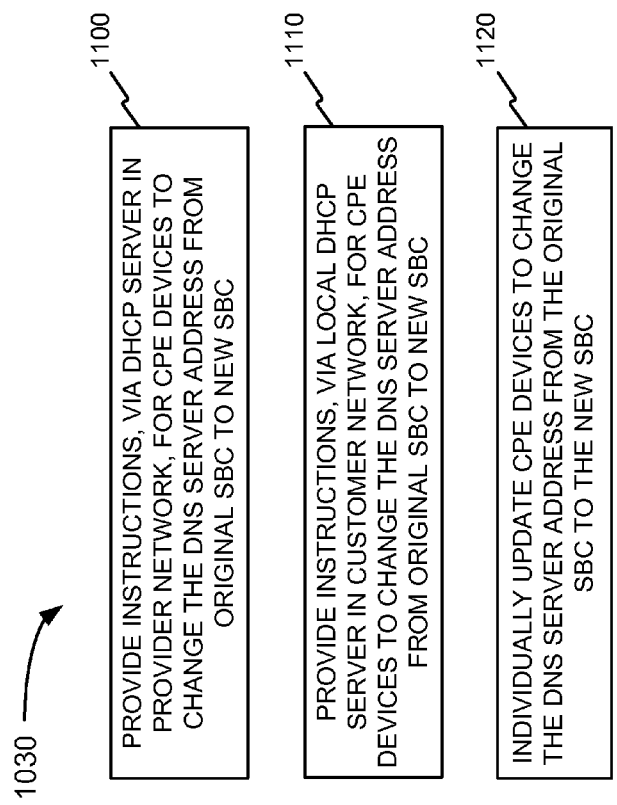

FIGS. 10 and 11 provide flow charts of an exemplary process 1000 for migrating devices within a private IP customer network to a new SBC according to implementations described herein. In one implementation, some or all of process 1000 may be performed by one or more devices associated with a provider network (e.g., provider network 520), such as provisioning server 250, SBC 540, and/or DNS server 240. In other implementations, some or all of process 900 may be performed by another device or group of devices associated with the provider network.

Process 1000 may include provisioning a new SBC with FQDNs and translation rules associated with a CPE's original SBC (block 1010) and updating DNS server entries with IP addresses for the new SBC (block 1020). For example, as described above in connection with FIG. 6, provisioning server 250 may provision, on SBC 540-2, the unique customer-side signaling FQDN and the unique carrier-side signaling FQDN originally associated with SBC 540-1, as indicated by reference number 610. Provisioning server 250 may also provision, on SBC 540-2, any translation rules associated with the unique customer-side signaling FQDN and the unique carrier-side signaling FQDN. The DNS component (e.g., DNS component 560-2) of SBC 540-2 may update DNS entries with new IP addresses (e.g., static IPv4 or IPv6 addresses) and ports for the unique customer-side signaling FQDN and the unique carrier-side signaling FQDN for the new SBC (e.g., SBC 540-2).

Returning to FIG. 10, IP addresses for DNS server components of the new SBC may be provided to CPE devices (block 1030). For example, IP addresses associated with the new SBC may be provided to CPE devices 210 in a transparent or semi-transparent manner as described further in connection with FIG. 11.

Updated DNS entries for the FQDNs may be provided (block 1040), and subsequent SIP session signaling from CPE may be received at the new SBC (block 1050). For example, as described above in connection with FIG. 6, CPE device(s) 210 may update their DNS cache from DNS component 560-2 associated with SBC 540-2 (e.g., instead of DNS component 560-1 in the pre-migration configuration), as indicated by reference number 630. For example, CPE device 210 may request updates from DNS component 560-2/SBC 540-2 based on expiration of a time-to-live value for a DNS entry stored at CPE device 210. In response to the request from CPE device 210, DNS component 560-2/SBC 540-2 may provide updated DNS entries 630. Similarly, proxy server 230 may update its DNS cache from DNS server 240, as indicated by reference number 640. After CPE device 210 has updated its DNS cache, CPE device 210 may initiate a subsequent call session 650 through SBC 540-2, using the same FQDN that previously routed to SBC 540-1 before the SBC migration. Similarly, after proxy server 230 has updated its DNS cache, proxy server 230 may route subsequent call session 650 (e.g., initiated by an endpoint other than CPE 210) through SBC 540-2, using the same FQDN that previously routed to SBC 540-1 before the SBC migration.

Again referring to FIG. 10, configuration information associated with the CPE may be deleted from the original SBC (block 1060). For example, as described above in connection with FIG. 6, provisioning server 250 may send instructions to SBC 540-1 to delete the migrated customer-side signaling FQDN and carrier-side signaling FQDN, as indicated by reference number 660. Delete instructions 660 may be provided at a time after DNS cache update 630 and DNS cache update 640 would be completed based on, for example, the maximum period of a time-to-live value for a DNS entry stored at CPE device 210 and/or proxy server 250.

Process block 1030 may include one of the process blocks depicted in FIG. 11. As shown in FIG. 11, instructions may be provided, via a DHCP server in the provider network, for CPE devices to change the DNS server address from the original SBC to the new SBC (block 1100). For example, as described above in connection with FIG. 6, provisioning server 250 may provide DHCP update 620 to SBC 540-1. DHCP update 620 may include instructions to change, in the DHCP information for customer network 510, the DNS server address from the static IP addresses of SBC 540-1 to the static IP addresses of SBC 540-2. In one example, the DHCP component (e.g., DHCP 550-1) of SBC 540-1 may receive DHCP update 620 and forward DHCP update 620 to local DHCP server 530. Local DHCP server 530 may, in turn, provide DHCP update 620 to CPE device(s) 210 so as to provide the static IP addresses of SBC 540-2/DNS component 560-2 as the new DNS server address.

Alternatively, instructions may be provided, via a local DHCP server in the customer network, for CPE devices to change the DNS server address from the original SBC to the new SBC (block 1110). For example, as described above in connection with FIG. 7, manual DHCP update 710 may be provided by a network administrator of customer network 510. In another example, manual DHCP update 710 may be provided by, for example, an operator of provider network 520 using a remote interface connection. DHCP update 710 may change the DNS server address from the original static IP addresses of SBC 540-1 to the 'new' static IP addresses of SBC 540-2. Local DHCP server 530 may, in turn, provide DHCP update 720 to CPE device(s) 210 so as to provide the static IP addresses of SBC 540-2/DNS component 560-2 as the new DNS server address.

Alternatively, CPE devices may be individually updated to change the DNS server address from the original SBC to the new SBC (block 1120). For example, as described above in connection with FIG. 8, manual IP address changes 810 may be provided by a network administrator of customer network 510 and/or users of CPE device(s) 210. Manual IP address changes 810 may change, within each CPE device 210, the DNS server address from the original static IP addresses of SBC 540-1 to the 'new' static IP addresses of SBC 540-2.

Implementations described herein may provide systems and/or methods that may provide information to devices within a provider network to migrate customer devices within a customer network from an original session border controller (SBC) device of the provider network to a new SBC device, where the provisioning information includes one or more fully-qualified domain names (FQDNs) associated with the original SBC device. The systems and/or methods may update DNS server entries for the one or more FQDNs with an Internet Protocol (IP) address associated with the new SBC device and provide, to the customer devices within the customer network, DNS entry updates for the one or more FQDNs. The new SBC device may then receive SIP session signals from the customer devices and the configuration information associated with the customer may be deleted from the original SBC.

The foregoing description provides illustration and description, but is not intended to be exhaustive or to limit the implementations to the precise form disclosed. Modifications and variations are possible in light of the above teachings or may be acquired from practice of systems and/or methods disclosed herein.

For example, while series of blocks have been described with regard to the flowcharts of FIGS. 9-11, the order of the blocks may differ in other implementations. Further, non-dependent blocks may be performed in parallel.

Also, although the Session Initiation Protocol (SIP) may be mentioned in reference to an implementation associated with the concepts described herein, other layer five IP signaling protocols may be employed (e.g., H.323, Media Gateway Control Protocol (MGCP), and/or Megaco/H.248). Accordingly, the concepts described herein are not dependent on employing a particular protocol.

It will be apparent that exemplary aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, block, or instruction used in the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

What is claimed is:

1. A method comprising:
receiving, by a new session border controller (SBC) device of a provider network, provisioning information to migrate customer devices within a customer network from an original SBC device, of the provider network, to the new SBC device,
the provisioning information including one or more fully-qualified domain names (FQDNs) associated with the original SBC device;
sending, by the original SBC device and to a dynamic host configuration protocol (DHCP) server, configuration information, for the customer devices, to change an IP address associated with a DNS component of the original SBC device to a new IP address associated with a DNS component of the new SBC device;
updating domain name system (DNS) server entries for the one or more FQDNs based on the provisioning information;
providing, to the customer devices within the customer network, DNS entry updates for the one or more FQDNs based on the updating of the DNS server entries; and
receiving, by the new SBC device, a session initiation protocol (SIP) session signal from a particular customer device of the customer devices.

2. The method of claim 1, further comprising:
providing, to the original SBC device and at a time after the updating of the DNS server entries is complete, instructions to delete the one or more FQDNs from the original SBC device.

3. The method of claim 1, where the DNS component of the new SBC device provides the DNS entry updates.

4. The method of claim 1, further comprising:
providing, to the particular customer device and before receiving the SIP session signal, the new IP address associated with the DNS component of the new SBC device.

5. The method of claim 1, further comprising:
receiving, by the original SBC device and from a provisioning server within the provider network, the configuration information, for the customer devices, to change the IP address associated with the DNS component of the original SBC device to the new IP address associated with the DNS component of the new SBC device.

6. The method of claim 1, further comprising:
providing, to a proxy server within the provider network, the DNS entry updates for the one or more FQDNs; and
receiving another SIP session signal from the proxy server, the other SIP session signal being directed from the proxy server based on the DNS entry updates.

7. The method of claim 1, further comprising:
sending, to the new SBC device and from a provisioning server within the provider network, the provisioning information that includes the one or more FQDNs associated with the original SBC device.

8. A system comprising:
a first session border controller (SBC) device; and
a second SBC device to:
receive one or more fully-qualified domain names (FQDNs) associated with the first SBC device during a migration of one or more customer premises equipment (CPE) devices from the first SBC device to the second SBC device,
the one or more CPE devices being within a customer network,
update domain name system (DNS) server entries for the one or more FQDNs,
send information based on the DNS server entries to the one or more CPE devices, and
receive a session initiation protocol (SIP) session signal from one of the one or more CPE devices,
the first SBC device being to:
send, to a dynamic host configuration protocol (DHCP) server, configuration information, for the one or more CPE devices, to change a first IP address associated with a fist domain name system (DNS) component of the first SBC device to a second IP address associated with a second DNS component of the second SBC device.

9. The system of claim 8, further comprising:
a provisioning server to:
provide, to the second SBC device, the one or more FQDNs associated with the first SBC device.

10. The system of claim 8, where the first SBC device is further to:
receive, from a provisioning server, the configuration information for the DHCP server.

11. A non-transitory computer-readable medium storing instructions, the instructions comprising:
one or more instructions that, when executed by at least one processor, cause the at least one processor to:
provide, to a new session border controller (SBC) device, provisioning information to migrate one or more customer devices within a customer network from an original SBC device of a provider network to the new SBC device,
the provisioning information including one or more fully-qualified domain names (FQDNs) associated with the original SBC device;
provide, to the original SBC device, a dynamic host configuration protocol (DHCP) update,
the DHCP update including instructions to change a domain name system (DNS) address from a first Internet Protocol (IP) address associated with the original SBC device to a second IP address associated with the new SBC device; and
provide, to the original SBC device and at a time after updating of DNS server entries is complete, instructions to delete the one or more FQDNs from the original SBC device.

12. The non-transitory computer-readable medium of claim 11,
where the provisioning information further includes translation rules for handling the one or more FQDNs, and
where the one or more FQDNS include:
a unique customer side signaling FQDN associated with the customer network, and
a unique carrier side signaling FQDN associated with the provider network.

13. The system of claim 8, where the second SBC device is further to:
send information based on the DNS server entries to one or more proxy servers, and
receive another SIP session signal from one of the one or more proxy servers.

14. The system of claim 8, where the first SBC device is further to:
receive instructions to delete the one or more FQDNs from the first SBC device, and
delete the one or more FQDNs based on the instructions.

15. The non-transitory computer-readable medium of claim 11,
where the original SBC device includes a first DNS component,
where the first IP address is associated with the first DNS component,
where the new SBC device includes a second DNS component, and
where the second IP address is associated with the second DNS component.

16. The non-transitory computer-readable medium of claim 11, where the one or more instructions to provide the instructions to delete the one or more FQDNs include:
one or more instructions that, when executed by the at least one processor, cause the at least one processor to:
determine the time based on a time-to-live value for a DNS entry, of the DNS server entries, at one of the one or more customer devices, and
provide, at the time, the instructions to delete the one or more FQDNs.

17. A method comprising:
receiving, by a first session border controller (SBC) device, configuration information, for customer devices, to change a first IP address associated with a first domain name system (DNS) component of the first SBC device to a second IP address associated with a second DNS component of a second SBC device when the customer devices are migrated from the first SBC device to the second SBC device, the customer devices being within a customer network;
providing, by the first SBC device and to a dynamic host configuration protocol (DHCP) server in the customer network, the configuration information, for the customer devices, to change the first IP address associated with the first DNS component of the first SBC device to the second IP address associated with the second DNS component of the second SBC device;
receiving, by the second SBC device, provisioning information to migrate the customer devices from the first SBC device to the second SBC device, the provisioning information including one or more fully-qualified domain names (FQDNs) associated with the first SBC device;

updating domain name system (DNS) server entries for the one or more FQDNs based on the provisioning information; and providing, to the customer devices, DNS entry updates for the one or more FQDNs based on the updating of the DNS server entries.

18. The method of claim 17, further comprising:

receiving instructions to delete the one or FQDNs from the first SBC device, and deleting, based on the instructions, the one or more FQDNs from the first SBC device.

19. The method of claim 18, where the instructions are received at a time after updating of DNS server entries, associated with the second SBC device and the customer devices, is complete.

20. The method of claim 17, further comprising:

receiving, by the second SBC device and after receiving the provisioning information, a session initiation protocol (SIP) session signal from a particular customer device of the customer devices, the SIP session signal being directed to the second SBC device based on the DNS entry updates.

* * * * *